United States Patent [19]
Ellis et al.

[11] Patent Number: 5,922,085
[45] Date of Patent: Jul. 13, 1999

[54] PREPARATION OF A DYE FOR COLORING PROTEIN-BASED FIBERS AND CELLULOSE-BASED MATERIALS FROM THE OXIDATION PRODUCTS OF THE MANUFACTURE OF A TRIPHENYLMETHANE DYE

[75] Inventors: Gray D. Ellis, Proctorville, Ohio; Belinda J. DiMarcello, Sparta, N.J.; Debra J. Bradshaw, Huntington, W. Va.

[73] Assignee: BASF Corporation, Southfield, Mich.

[21] Appl. No.: 08/941,406

[22] Filed: Sep. 30, 1997

[51] Int. Cl.⁶ .................. D06P 3/06; D06P 3/04; D06P 1/30

[52] U.S. Cl. .................. 8/404; 8/406; 8/438; 8/524; 8/638; 8/641; 8/649; 8/650; 8/652; 8/658; 8/662; 8/680; 8/681; 8/916; 8/917; 8/918; 8/919

[58] Field of Search .................. 8/404, 406, 438, 8/524, 638, 641, 649, 650, 652, 658, 662, 680, 681, 916, 917, 918, 919

[56] References Cited

U.S. PATENT DOCUMENTS

| | | |
|---|---|---|
| 250,201 | 11/1881 | Caro ............................. 552/112 |
| 471,638 | 3/1892 | Homolka . |
| 1,694,057 | 12/1928 | Cole . |
| 2,542,544 | 2/1951 | Loukomsky et al. . |
| 3,884,869 | 5/1975 | Conger, Sr. . |
| 4,800,043 | 1/1989 | Allen et al. ..................... 552/114 |
| 4,952,677 | 8/1990 | Spence et al. .................. 534/573 |
| 5,593,491 | 1/1997 | Karnell . |

FOREIGN PATENT DOCUMENTS

| | | |
|---|---|---|
| 467085 | 6/1937 | United Kingdom . |
| 467093 | 6/1937 | United Kingdom . |

OTHER PUBLICATIONS

Colour Index, Third Edition, vol. 4, p. 4393 (month unknown), 1971.

Green et al., *J. Soc. Dyers Colourists*, 29, pp. 105–115, Apr. 1913.

*Primary Examiner*—Alan Diamond

[57] ABSTRACT

A process of preparing a dye composition and a resultant dye composition. The process includes preparing a mixture comprising a triphenylmethane dye and oxidation products by reacting methylenedianiline, aniline, an oxidation catalyst, and an oxidant; separating the oxidation products from the triphenylmethane dye to produce an aqueous solution of oxidation products; treating the solution of oxidation products with a basic compound; separating unreacted aniline from the solution of oxidation products and forming a mixture of oxidation products; and sulfonating the mixture of oxidation products to form a dye composition.

32 Claims, No Drawings

5,922,085

1

PREPARATION OF A DYE FOR COLORING PROTEIN-BASED FIBERS AND CELLULOSE-BASED MATERIALS FROM THE OXIDATION PRODUCTS OF THE MANUFACTURE OF A TRIPHENYLMETHANE DYE

FIELD OF THE INVENTION

The present invention relates to a process of preparing a dye composition from the oxidation products of the synthesis of a triphenylmethane dye, such as pararosaniline, and more particularly to a process where the products of the triphenylmethane dye synthesis are rendered water soluble and suitable for application as dyes or colorants to various protein-based fibers and cellulose-based materials. The invention further relates to dye compositions formed by such processes, methods of dyeing fibers and fabrics with the dye compositions of the invention, and the dyed materials produced thereby.

BACKGROUND AND SUMMARY OF THE INVENTION

Triphenylmethane dyes, such as pararosaniline, may be prepared by oxidation of the condensation products of excess aniline with formaldehyde. Pararosaniline, also known as fuchsin, parafuchsin, Basic Red 9, Magenta 0, and C.I. 42500, is commercially produced via this synthesis with formation of by-products or oxidation products that have, up to this time, had no commercial value. The by-products of the triphenylmethane dye synthesis have found only limited application as colorants in situations where the by-product could be melted and blended with the substance to be colored. The by-products were also employed as colorants by dispersing them in a mixture with a solid resin or like material, as in, for example, U.S. Pat. No. 3,884,869, incorporated herein by reference. Thus, the by-product mixture could only be used as a pigment and modification of the by-products for use as a dye was unknown.

The present invention provides a process of preparing a dye composition which employs oxidation products (typically referred to as by-products) of a triphenylmethane dye synthesis and a resultant dye composition. The process includes preparing a mixture of a triphenylmethane dye and the oxidation products by reacting methylenedianiline with aniline, an oxidation catalyst, and an oxidant. Oxidation by-product as used herein is to be understood to mean the desired oxidation products of the condensation reaction, and subsequent oxidation, of methylenedianiline that are employed as the dye composition of the present invention.

The process further includes separating the oxidation products from the triphenylmethane dye to produce a solution of oxidation products; treating the solution of oxidation products with a basic compound, which is typically dissolved in water; separating unreacted aniline from the solution of oxidation products to form a mixture of oxidation products; and sulfonating the mixture of oxidation products to form a dye composition.

The present invention also provides a process of dyeing protein-based fibers and the resultant colored protein-based fibers. The process includes providing a dye composition prepared according to the process steps as set forth above; immersing the protein-based fibers in a container of water and an acid; dissolving the dye composition in a separate container of water, producing a dye solution; adding to the dye solution sodium sulfate and an acidic compound, such as acetic acid, sulfuric acid, propionic acid, phosphoric acid,

2 and mixtures thereof; and stirring the protein-based fibers into the dye solution and heating the solution to produce colored protein-based fibers. The fibers may be, but are not limited to, textile fibers, such as wool and silk, and carpet fibers.

The present invention additionally provides a process of dyeing cellulose-based materials and the resultant colored cellulose-based materials. The process includes providing a dye composition prepared according to the process steps as set forth above; immersing the cellulose-based fibers in a container of water; dissolving the dye composition in a container of water, producing a dye solution; adding to the dye solution sodium sulfate and an acidic compound, such as acetic acid, sulfuric acid, propionic acid, phosphoric acid, or a mixture of these acids; and soaking the cellulose-based materials in the dye solution and heating the solution to produce colored cellulose-based materials.

The present invention also provides a dye composition comprising sulfonated oxidation products that produces a variety of hues for dyeing protein-based fibers and cellulose-based materials. In addition, the dye composition is resistant to fading from both light and washing, and has a low-cost of manufacture.

DETAILED DESCRIPTION

A process of preparing a dye composition has now been discovered. The composition comprises the sulfonated oxidation products or by-products of a process for synthesizing a triphenylmethane dye, and most preferably comprises the sulfonated oxidation products or by-products of pararosaniline.

The oxidation by-products of the present invention may be formed by oxidizing the various compounds of methylenedianiline produced in the synthesis of pararosaniline. The oxidation by-products of this synthesis are believed to be a mixture of compounds structurally similar to acridines, phenazines, phenosafranines, or the various aniline blacks. The by-product composition of the pararosaniline synthesis may then be rendered water soluble by sulfonation and applied as a dye or colorant to various protein-based fibers, such as wool and silk, and to cellulose-based materials, such as wood pulp and cotton.

The process of preparing a dye composition of the present invention includes treating aniline with an acid. Preferred acids include, without limitation, hydrochloric acid, anhydrous hydrogen chloride, aqueous hydrochloric acid, acetic acid, and mixtures of these. The reaction produces an aniline acid salt, such as an aniline hydrochloride salt, having a degree of protonation ranging from less than about 10% to greater than about 90%. This salt is then reacted with a source of formaldehyde in a preferred ratio of about two moles of salt to about one mole of formaldehyde to form methylenedianiline. The source of formaldehyde preferably includes a formalin solution, gaseous formaldehyde or solid paraformaldehyde. Among the products of this reaction are various isomers of methylenedianiline, for example, 4, 4'-methylenedianiline and 2, 4-methylenedianiline. The condensation reaction of aniline and formaldehyde generally produces these isomers in a ratio of approximately 65% 4, 4'-methylenedianiline isomer and 34% 2, 4-methylenedianiline isomer. Additional compounds may also be produced, such as aniline compounds and a multi-ring compound.

The mixture of methylenedianiline compounds and additional compounds is then oxidized by adding an oxidation catalyst, aniline, and an oxidant. The oxidation reaction produces a mixture comprising a triphenylmethane dye and oxidation by-products. The oxidation of methylenedianiline to a triphenylmethane dye typically requires at least two to three moles of aniline, which also provides a solvent effect for the reaction products. In addition, a portion of the aniline is oxidized to form minor components of the by-product dye composition, such as aniline black compounds.

The oxidation catalyst used in the present process is preferably, but not limited to, a catalyst including any element from groups VB and VIB, such as vanadium or molybdenum. A vanadium oxide catalyst, as disclosed in U.S. Pat. No. 2,542,544, incorporated herein by reference, is most preferably used in the synthesis of the present invention. The oxidation catalyst may include sodium metavanadate, ammonium metavanadate, vanadium(IV) oxychloride, vanadium(V) oxychloride, and mixtures of these. The oxidant employed is preferably air, oxygen, or oxygen enriched air.

The reaction in which the 4, 4'-methylenedianiline is formed is preferably carried out with a ratio of aniline to formaldehyde at the beginning of the reaction of greater than 2:1, a temperature of from about 10 to about 100° C., and with greater than or equal to about 5% of the aniline being protonated. This 4, 4'-methylenedianiline isomer produces pararosaniline and a small proportion of the dye composition of the present invention. For example, the oxidation of 4, 4'-methylenedianiline may form approximately 85% pararosaniline and only 15% of the oxidation by-products used for the present dye composition. The oxidation of the 2, 4-methylenedianiline isomer, however, produces the major component of the by-product dye composition in the form of, for example, compounds with structures similar to acridine compounds. A three-ring compound is also believed to be formed during the synthesis of the triphenylmethane dye and is oxidized to become a part of the oxidation by-products used to produce the dye of the present invention.

As will be fully appreciated by the skilled artisan, the proportion of isolated pararosaniline to oxidation by-products may be adjusted by varying the conditions under which the oxidation reaction occurs, including temperature, pressure, time of reaction, catalyst level and type, and oxidant concentration. For example, the conditions most favorable to pararosaniline formation are temperatures of at least about 90 and up to about 120° C., pressures of at least about 20 and up to about 100 psi, catalysts levels (such as vanadium or molybdenum catalysts) of greater than 1.5 millimoles per mole of methylenedianiline, and an increased oxygen content.

The triphenylmethane dye synthesized by the process of the present invention is preferably, but not limited to, pararosaniline. Any triphenylmethane dye that is synthesized by condensing at least 2 moles of an aminobenzene-based compound onto at least one mole of formaldehyde and then oxidizing the condensation product is included within the scope of this invention. Examples of dyes that have similar properties and applications may include Acid Violet 4BN, Acid Violet 3BN, Acid Violet R (extra), Acid Blue 15, Acid Violet 17, Acid Violet 23, Acid Violet 72, Food Violet 1, Mordant Violet 39, Mordant Violet, 27, and Mordant Violet 33.

According to a preferred embodiment of the present invention, first a solution of oxidation by-products is produced when the oxidation by-products are separated from pararosaniline. The step of separating the oxidation by-products from the triphenylmethane dye may be accomplished by a variety of methods. One preferred way to separate the by-products is by adjusting the pH of said mixture to about 7 by treating said mixture with a basic compound, such as sodium hydroxide, and water; converting the triphenylmethane dye to an insoluble form, for example, by adding an anion, such as, but not limited to, nitrate, bisulfate or cyanide; and then filtering the mixture to remove the insoluble triphenylmethane dye. The anion employed may be any anion that makes the triphenylmethane dye insoluble in aniline.

Another preferred method of separation is by adding a solvent to the mixture in which the triphenylmethane dye is insoluble and the desired oxidation by-products are soluble, followed by filtering the mixture to remove the triphenylmethane dye. The solvent employed may be any benzene or alkyl-substituted benzene compound, such as, but not limited to, toluene, cumene, xylene, and ethyl benzene.

The filtrate, which is the desired solution of oxidation by-products, may then be further processed by adding to the solution a basic compound, which is typically dissolved in water. The basic compound that is added is preferably, but not limited to, sodium hydroxide. A sufficient amount of basic compound, and preferably water, is added to adjust the pH to at least about 10.5, preferably to a lower limit of about 12 and to an upper limit of about 13.8. This allows the removal of any inorganic salts present in the solution, particularly nitrates and chlorides, from the organic phase by a phase separation.

A mixture of oxidation by-products or products is formed by separating aniline from the solution of oxidation products. The aniline is preferably separated by, but not limited to, distillation. Less than 1% of unreacted aniline is preferably remaining in the solution after distillation. The mixture of oxidation by-products may then be treated by grinding, for example, to form a powder.

The mixture of oxidation by-products is then sulfonated. The sulfonation step of the present invention is carried out by adding concentrated sulfuric acid to the dye composition and heating the mixture. The mixture is preferably heated to from about 40 to about 90°C., and most preferably to from about 50 to about 80° C. The sulfonation of the mixture of oxidation by-products renders the by-products water soluble and capable of being permanently bound to protein-based fibers and cellulose-based materials. The sulfonated oxidation by-products are large, multi-ring structures that are effective as dyes for coloring, for example, yarns made from wool and wood pulp. In addition, the sulfonation step dissolves the remaining unsulfonated, water soluble salts of 4, 4'-methylenedianiline and aniline, so that they may be separated and washed out.

The compounds of the by-product mixture may be mono- or polysulfonated depending on their various structures and the conditions of the sulfonation process of the present invention. For example, decreased temperatures of 25–35° C. and the use of 95–98% sulfuric acid favors the formation of monosulfonated compounds, whereas increased temperatures, such as about 40–80° C. and higher concentration levels of sulfonating agents, such as oleum, produce greater amounts of polysulfonated materials. The monosulfonated by-product compounds are the preferred components of the by-product dye composition because the polysulfonated components are more water soluble and, subsequently, harder to isolate than the monosulfonated components.

Protein-based fibers may be dyed using the sulfonated oxidation by-product dyes. The fibers include, but are not limited to, textile fibers, such as wool and silk, and carpet fibers. The process of the present invention may additionally be used to dye or color woven fabric.

The process for dying these fibers includes preparing a dye composition according to the process of the present invention, and then immersing the fibers in a container of water and an acid, such as acetic acid or aqueous hydrochloric acid. The dye composition is then dissolved in a separate container of water, producing a dye solution to which sodium sulfate and an acidic compound is added in an amount of about 1–15% of the weight of the fiber. The acidic compound includes, but is not limited to, any short-chained ($C_1$ to $C_{10}$) carboxylic acid, such as acetic acid or propionic acid; any hydrates of sulfur trioxide, such as sulfuric acid or oleum; phosphoric acid; polyphosphoric acid; and mixtures of these. The acidic compound is utilized as a levelling agent for the dye, aiding in the uniform dispersion of the dye in solution. The fibers are stirred into the dye solution and the solution is heated to from about 80 to about 100°C., producing colored protein-based fibers. The fibers may be dyed, for example, dark brown, golden brown, and reddish brown, depending on the conditions of the reaction, such as the acid used in the dye pot during the dyeing procedure.

Cellulose-based materials may be dyed with the compositions of the present invention to produce colored cellulose-based materials. The materials are preferably, but not limited to, wood pulp and cotton. The process includes preparing a dye composition according to the process of the present invention, and then immersing the cellulose-based materials in a container of water. The dye composition is also dissolved in a separate container of water, producing a dye solution to which sodium sulfate and an acidic compound is added in an amount of about 1–15% of the weight of the material. The acidic compound includes, but is not limited to, any short-chained ($C_1$ to $C_{10}$) carboxylic acid, such as acetic acid or propionic acid; any hydrates of sulfur trioxide, such as sulfuric acid or oleum; phosphoric acid; polyphosphoric acid; and mixtures of these. The cellulose-based materials are then soaked in the dye solution, and the solution is heated to from about 80 to about 100° C., producing colored cellulose-based materials.

The invention is further described in the following examples. The examples are merely illustrative and do not in any way limit the scope of the invention as described and claimed.

EXAMPLES

Example 1
Preparation of the By-Product Residue Used in Preparing the Dye Composition Add 11,837 grams (127.28 moles) of aniline and 2031 grams of 32% hydrochloric acid (17.8 moles) to a reaction vessel, allow to stir, and add, as rapidly as possible, 1085 grams of 35% formalin (12.64 moles). Heat this reaction mass to 130° C. and maintain this temperature over a three hour period. Cool to 110° C. and add 1.5 millimoles of sodium metavanadate per mole of formaldehyde. Blow 90 psig air through the mass for 2.5–3.5 hours. Add 3300 grams of water and a sufficient amount of 50% sodium hydroxide solution to reach a pH of about 7. Allow the mass to stand for one hour and then separate the water layer from the reaction mass.

Add 1850 grams of a solution of sodium nitrate (950 grams of sodium nitrate, 11.18 moles, in 1900 grams of water) at 90° C. to the reaction mixture. Vacuum distill the water out of the reaction mass while maintaining gentle agitation over a period of two hours to form crystals of pararosaniline nitrate as the water is removed. Filter this mass to remove the crystals, which are separately processed to make pararosaniline.

The filtrate aniline solution of oxidation by-products is treated with an equal volume of 18% sodium hydroxide solution to remove any inorganic salts, specifically nitrates and chlorides, present in the organic phase. Phase separate, keeping the organic phase and discarding the aqueous phase. Vacuum distill the organic phase until a solid residue containing less than 2% aniline by weight is obtained. Cool this residue of oxidation by-product mixture and grind it to a fine powder.

Example 2
Sulfonation of the Ground Residue of Oxidation By-Products

Add 95 ml of 98% $H_2SO_4$ to a 1000 ml 3-neck flask and cool to 15° C. in an ice bath. Slowly add 50 g of ground residue prepared according to Example 1 to the flask while the mixture is stirred. Remove the ice bath and heat the reaction mixture to 40° C. Add 15 ml of $H_2SO_4$ to the flask and check a sample of the reaction mixture for evidence of sulfonation. If no sulfonation has occurred, add an additional 10 ml of $H_2SO_4$ to the flask and increase the heat to 50° C. If the sample still shows no evidence of sulfonation, make further 10 ml additions of $H_2SO_4$ to the flask while the temperature is increased to 80° C. until sulfonation occurs. Add the reaction mixture into three liters of water and filter the solution. Retain the filter cake and aqueous filtrate prepared from the residue for use as a dye composition.

Procedure for Dying Wool Yarn with the Sulfonated Oxidation By-Products in Examples 3–7

Wash 100% virgin wool yarn, or similar fiber material, that has been dry weighed and soak the fiber material in hot water containing soap at approximately 50° C. Enough soap should be used to make the water slippery without producing suds. The fiber material should soak for a short time, such as 15–20 minutes, in the hot water. Next, hot water soak the fibers at approximately 50° C. Rinse the fibers in hot water and 0.5% acetic acid and soak the material for a short time, such as 15 minutes, in a dilute acetic acid solution (about 1 ml acetic acid in about 200 ml of water). Soak the fibers in clean hot water (50° C.) and repeat the clean hot water soak if traces of soap are evident. If the fibers subsequently dry, soak them in warm water for at least 20 minutes and squeeze out excess water before placing the fibers in a dye pot.

Next, dissolve an amount of the sulfonated ground residue dye composition prepared according to Examples 1 and 2 in 50° C. water (30 ml of water per gram of dry fiber weight) and add sodium sulfate at 20% of the weight of dry fiber used. (Weight of fiber×0.20=weight of sodium sulfate to use.) Stir the solution to dissolve the added components and add about 4% acetic acid (by weight of the fiber). Mix the wetted fibers into the solution and heat the solution to about 80° C. over a 15 minute period, stirring frequently. Continue to heat the solution to about 95–100° C. and hold at that temperature for 45 minutes. Stir the solution occasionally.

Lastly, allow the fibers to cool before washing with a neutral detergent. Rinse the fibers thoroughly, remove any excess water, and dry the fibers.

Example 3

The sulfonated filtrate prepared according to the procedure in Example 2 was used as the dye composition to dye wool fibers. The pH of the filtrate was adjusted to 6.5 with 50% NaOH and acetic acid was added to adjust the pH to about 2.00. This solution was filtered. 4.33 g of dry fiber was washed, dried, and dyed according to the above procedure, adding 129.9 ml of filtrate (30 ml of the filtrate solution per gram of dry fiber) and 0.9 g of sodium sulfate to a dye pot. The resulting dyed fibers were a deep, dark brown color.

Example 4

The filter cake from the sulfonated residue prepared according to the procedure in Example 2 was dried and used to prepare the dye composition. 6.00 g of dry fiber was washed, dried, and dyed according to the wool dyeing procedure above, adding 0.6 g of ground filter cake, 180 ml of water, 1.2 g of sodium sulfate, and 0.4 g of acetic acid (7% by weight of fiber) to the dye pot. The resulting dyed fibers were a light, golden brown color.

Example 5

The wet filter cake from the sulfonated residue according to the procedure of Example 2 was used for the dye composition. 7.04 g of dry fiber was washed, dried, and dyed according to the wool dyeing procedure, adding 1.03 g of wet filter cake, 210 ml of water, 1.4 g of sodium sulfate, and 0.46 g of acetic acid (6.5% by wt. of fiber) to the dye pot. The resulting dyed fibers were a rich, reddish brown color.

Example 6
Use of Sulfuric Acid in Dye Pot

1–2% of concentrated sulfuric acid (to wt. of fiber) was used in place of acetic acid for leveling the dye composition. The weight of $H_2SO_4$ used was 11% of the weight of fiber used.

The dried filter cake from the sulfonated residue according to the procedure of Example 2 was used. 1.6 g of fiber was washed, dried, and dyed according to the wool dyeing procedure, adding 0.16 g of dried filter cake, 48 ml of water, 0.32 g of sodium sulfate, and 0.18 g of sulfuric acid to a dye pot.

After 45 minutes of dyeing the fiber, the fiber was "top-chromed" by dissolving 3% (of wt. of fiber) of sodium dichromate in 10 ml water. Several ml of cool water at 78° C. was added to the dye pot. The fiber was stirred occasionally while the temperature was heated to 95–100° C. for 60 minutes. The yarn was then cooled, washed in cool water with a small amount of mild soap without suds and rinsed well. The resulting dyed fibers were a deeper, darker brown as compared to Examples 3–5.

Example 7
Use of Dried Filter Cake From the Sulfonated Residue for the Dye Composition The fibers here were dyed according to the procedure in Example 6, except the "top-chroming" procedure was eliminated.

1.5 g of fiber was washed, dried, and dyed according to the wool dyeing procedure, adding 0.15 g of the filter cake, 45 ml of water, 0.165 g of concentrated sulfuric acid, and 0.3 g of sodium sulfate. The resulting dyed fibers were a medium reddish brown color.

The invention has been described in detail with reference to preferred embodiments thereof. It should be understood, however, that variations and modifications can be made within the spirit and scope of the invention.

What is claimed is:

1. A process of preparing a dye composition, comprising the steps of:
   (a) preparing a mixture comprising a triphenylmethane dye and oxidation products by reacting methylenedianiline, aniline, an oxidation catalyst, and an oxidant;
   (b) separating said oxidation products from said triphenylmethane dye to produce an aqueous solution of oxidation products;
   (c) treating said solution of oxidation products with a basic compound;
   (d) separating unreacted aniline from said solution of oxidation products to form a mixture of oxidation products; and
   (e) sulfonating said mixture of oxidation products to form a dye composition.

2. A process according to claim 1, wherein said triphenylmethane dye is pararosaniline.

3. A process according to claim 1, wherein said methylenedianiline is an isomer selected from the group consisting of 2, 4-methylenedianiline, 4, 4'-methylenedianiline, and mixtures thereof.

4. A process according to claim 1, wherein said oxidation catalyst is a vanadium oxide catalyst.

5. A process according to claim 4, wherein said vanadium oxide catalyst is selected from the group consisting of sodium metavanadate, ammonium metavanadate, vanadium (IV) oxychloride, vanadium(V) oxychloride, and mixtures thereof.

6. A process according to claim 1, wherein said oxidant is selected from the group consisting of air, oxygen, oxygen enriched air, and mixtures thereof.

7. A process according to claim 1, wherein said separation step (b) is carried out by:
   (a) adjusting the pH of said mixture to about 7 by treating said mixture with a basic compound and water;
   (b) converting said triphenylmethane dye to an insoluble form with an anion selected from the group consisting of nitrate, bisulfate, cyanide, and mixtures thereof; and
   (c) filtering said mixture to remove said triphenylmethane dye.

8. A process according to claim 1, wherein said separation step (b) is carried out by:
   (a) adding to said mixture a solvent in which said triphenylmethane dye is insoluble and in which said oxidation products are soluble; and
   (b) filtering said mixture to remove said triphenylmethane dye.

9. A process according to claim 8, wherein said solvent is a benzene or alkyl-substituted benzene compound.

10. A process according to claim 1, wherein said basic compound is sodium hydroxide.

11. A process according to claim 1, wherein said sulfonation step (e) is carried out by adding sulfuric acid to said mixture of oxidation products and heating said mixture to from about 40 to about 90° C.

12. A process according to claim 1, wherein said oxidation products are based on the structures of compounds selected from the group consisting of acridines, phenazines, phenosafranines, aniline blacks, and mixtures thereof.

13. A process according to claim 1, wherein said mixture of oxidation products in step (d) is treated to form a powder.

14. A process of dyeing protein-based fibers, comprising the steps of:
   (a) providing a dye composition prepared according to claim 1;
   (b) immersing said protein-based fibers in a container of water and an acid;
   (c) dissolving said dye composition in a separate container of water, producing a dye solution;
   (d) adding to said dye solution sodium sulfate and an acidic compound; and (e) stirring said protein-based fibers into said dye solution and heating said solution to produce colored protein-based fibers.

15. A process of dyeing cellulose-based materials, comprising the steps of:
    (a) providing a dye composition prepared according to claim 1;
    (b) immersing said cellulose-based materials in a container of water;
    (c) dissolving said dye composition in a separate container of water, producing a dye solution;
    (d) adding to said dye solution sodium sulfate and an acidic compound; and
    (e) soaking said cellulose-based materials in said dye solution and heating said solution to produce colored cellulose-based materials.

16. A process of preparing a dye composition, comprising the steps of:
    (a) treating aniline with acid and a source of formaldehyde to form methylenedianiline;
    (b) oxidizing said methylenedianiline by adding an oxidation catalyst, aniline, and an oxidant, wherein the reaction produces a mixture comprising pararosaniline and oxidation products;
    (c) separating said oxidation products from pararosaniline to produce an aqueous solution of oxidation products;
    (d) adjusting the pH of said solution to at least about 10.5 by adding a basic compound and water;
    (e) separating unreacted aniline from said solution of oxidation products to form a mixture of oxidation products;
    (f) treating said mixture of oxidation products to form a powder; and
    (g) sulfonating said powder to form a dye composition.

17. A process according to claim 16, wherein said acid is selected from the group consisting of hydrochloric acid, anhydrous hydrogen chloride, aqueous hydrochloric acid, acetic acid, and mixtures thereof.

18. A process according to claim 16, wherein said methylenedianiline is an isomer selected from the group consisting of 2, 4-methylenedianiline, 4, 4'-methylenedianiline, and mixtures thereof.

19. A process according to claim 16, wherein said source of formaldehyde is selected from the group consisting of formalin solution, gaseous formaldehyde, solid paraformaldehyde, and mixtures thereof.

20. A process according to claim 16, wherein said oxidation catalyst is a vanadium oxide catalyst.

21. A process according to claim 20, wherein said vanadium oxide catalyst is selected from the group consisting of sodium metavanadate, ammonium metavanadate, vanadium (IV) oxychloride, vanadium(V) oxychloride, and mixtures thereof.

22. A process according to claim 16, wherein said oxidant is selected from the group consisting of air, oxygen, oxygen enriched air, and mixtures thereof.

23. A process according to claim 16, wherein said oxidation products are based on the structures of compounds selected from the group consisting of acridines, phenazines, phenosafranines, aniline blacks, and mixtures thereof.

24. A process according to claim 16, wherein said separation step (c) is carried out by:
    (a) adjusting the pH of said mixture to about 7 by treating said mixture with a basic compound and water;
    (b) converting said pararosaniline to an insoluble form with an anion selected from the group consisting of nitrate, bisulfate, cyanide, and mixtures thereof; and
    (c) filtering said solution to remove said pararosaniline.

25. A process according to claim 16, wherein said separation step (c) is carried out by:
    (a) adding to said mixture a solvent in which pararosaniline is insoluble and in which said oxidation products are soluble; and
    (b) filtering said solution to remove said pararosaniline.

26. A process according to claim 25, wherein said solvent is a benzene or alkyl-substituted benzene compound.

27. A process according to claim 16, wherein said sulfonation step (g) is carried out by adding sulfuric acid to said powder and heating said powder and sulfuric acid to from about 40 to about 90° C.

28. A process according to claim 16, wherein said basic compound is sodium hydroxide.

29. A process according to claim 16, wherein said pH of said solution is from about 12 to about 13.8.

30. A dye composition prepared according to the process of claim 1.

31. Colored protein-based fibers prepared according to the process of claim 14.

32. Colored cellulose-based materials prepared according to the process of claim 15.

* * * * *

UNITED STATES PATENT AND TRADEMARK OFFICE
CERTIFICATE OF CORRECTION

PATENT NO. : 5,922,085
DATED : July 13, 1999
INVENTOR(S) : Ellis et al.

It is certified that error appears in the above-identified patent and that said Letters Patent is hereby corrected as shown below:

On the title page, should read;

[75] Inventors: Gary D. Ellis, Proctorville, O.H.;
Belinda J. DiMarcello, Sparta, N.J.;
Debra J. Bradshaw, Huntington, W.V.

Signed and Sealed this

Fourteenth Day of December, 1999

Attest:

Q. TODD DICKINSON

Attesting Officer

Acting Commissioner of Patents and Trademarks